United States Patent [19]

Wisotzky et al.

[11] 4,048,269

[45] Sept. 13, 1977

[54] EMBOSSED SUEDE MATERIAL AND METHOD OF PREPARING SAME

[75] Inventors: Reuben Wisotzky, Lexington; John C. Bolger, Chelmsford, both of Mass.

[73] Assignee: Pandel-Bradford, Inc., Lowell, Mass.

[21] Appl. No.: 647,588

[22] Filed: Jan. 8, 1976

Related U.S. Application Data

[62] Division of Ser. No. 458,644, April 8, 1974, abandoned.

[51] Int. Cl.² .............................................. B29D 27/00
[52] U.S. Cl. ..................................... 264/25; 156/209; 264/284; 264/293; 264/321
[58] Field of Search ................. 264/321, 293, 284, 25; 156/247, 209

[56] References Cited

U.S. PATENT DOCUMENTS 3,562,043  2/1971  Eddy ................................ 156/209 X
3,887,678  6/1975  Lewicki ........................... 264/284 X Primary Examiner—Richard R. Kucia
Attorney, Agent, or Firm—Richard P. Crowley

[57] ABSTRACT

An embossed plastic suede material is prepared by the method of embossing under heat and pressure particular areas of a layer of a cellular plastic material characterized by a suede-like surface to provide an embossed surface composed of valley areas and peak areas, the peak areas characterized by a suede-like surface, the cellular structure beneath the valley areas differing from the cellular structure beneath the peak areas and characterized by a higher cell density.

4 Claims, 3 Drawing Figures

EMBOSSED SUEDE MATERIAL AND METHOD OF PREPARING SAME

This is a continuation division of application Ser. No. 458,644, now abandoned, filed Apr. 8, 1974.

BACKGROUND OF THE INVENTION

Plastic material having a suede-like surface has been prepared by a number of techniques. One process employed to prepare commercial imitation suede material comprises the mechanical abrasion of the surface of a supported cellular plastic layer (see U.S. Pat. No. 3,041,193). Another process comprises delaminating a cellular plastic layer along a section of the cellular layer, such as along a plane of tensile discontinuity between two foam layers, or by creating a plane of tensile continuity through employing a temperature gradient, or by the compounding of resins within a particular foam layer. This latter process is described more particularly in U.S. Pat. No. 3,709,752, issued Jan. 9, 1973, the disclosure of which is hereby incorporated by reference in its entirety into this application. Although these and other processes have been employed to provide a suede-like material suitable for use in belts, handbags, shoes and articles of apparel, such as coats, vests, jackets, etc., such techniques do not provide for the preparation of suede material in an easy, efficient and economical manner, which material has an embossed surface design thereon. A plastic material which has, in whole or in part, a suede-like surface and which also has an embossed design thereon, and is produced in an efficient and economic manner, would be quite useful to provide different design patterns and material, such as, for example, imitation cordurory-like material.

SUMMARY OF THE INVENTION

Our invention concerns an improved suede-like material composed of a layer of cellular plastic having both a suede-like surface thereon and an embossed surface thereon, and the method of preparing such materials. In particular, our invention relates to an embossed suede-like plastic material comprising a layer of cellular plastic composed of valley and peak areas and a predetermined surface design thereon, with the peak areas having a suede-like surface, and with the density of the cells beneath the valley areas being greater than the density of the cells beneath the peak areas.

We have discovered a method of preparing a unique embossed suede-like plastic material, which method comprises embossing under heat and pressure particular areas of a layer of a cellular plastic material characterized by a suede-like surface thereon. The embossing step is carried out to provide an embossed surface in the layer of the wholly cellular plastic composed of valley areas and peak areas which represent the indentations and compressions of the cellular layer made by the embossing roll or plate. In our technique, the peak areas of the resulting suede-like material are characterized by the original suede-like surface, so that the cellular structure beneath the peak areas is essentially the cellular structure prior to the embossing step.

The valley areas differ in cellular structure and cell density beneath the valley areas due to the compression of the areas in the embossing step. The valley areas are, therefore, characterized by a slightly compressed cell-type structure, such as an oval-type cell, and/or of a higher cell density directly beneath the valley areas. For example, the cell density of the cells of the plastic layer directly beneath the valley areas may be from about 50 to 200% greater in cell density than the cell density beneath the peak areas. Of course, the change of density is related to the amount of pressure and heat employed in the embossing step, and may be varied as desired. However, the heat and pressure employed in the embossing step should not be sufficient to change the cellular layer such as to compress completely and destroy substantially the cells which would change the area beneath the valley areas into a solid, less flexible layer.

By employing an embossing step such that the cellular nature of the layer of cellular plastic is retained, the suede-like material, supported or unsupported, continues to be very flexible like natural suede, while unusual design and imitative surface effects can be obtained. Of course, it is also part of our invention that the suede-like surface material may have a number of varying peak and valley areas of differing height in order to impart varying design effects, so that the cell density and cell structure beneath each area would vary, depending upon the embossing step, the nature of the plastic and the original nature of the cellular structure; that is, whether open or closed and cell size.

In our process, the suede-like material to be embossed may comprise any suede-like material which is composed of a layer of a cellular plastic having a suede-like surface appearance. Typically, the suede-like sheet material would comprise a fibrous material, such as a woven fabric like cotton fabric, having secured thereto a layer of cellular plastic with the suede-like surface appearance. The plastic can typically be composed of any plastic or polymeric material or resin which is capable of forming a cellular layer and which is thermoplastic when subject to deformation during the embossing step. However, the preferred material is a vinyl-halide resin, such as polyvinyl chloride and vinyl-chloride/vinyl-acetate resins and similar types of vinyl-chloride resins which are plasticized and cast or formed onto a supporting sheet. During the embossing step, the valley areas produced by the embossing are altered in appearance and are less or nonsuede-like in appearance after such embossing; therefore, providing a contrast between the raised suede-like surface of the peak areas and the nonsuede-like or smoother embossed surface of the valley areas. Of course, if desired, the valley or peak areas, or both, may be coated or printed to accentuate the differences between the two areas to provide unusual design effects.

In our process, the type and character of the embossing plate or roll used may not have all of the mechanical supports and requirements of typical embossing rolls and plates, since the embossing is done under very little pressure; i.e., merely sufficient pressure to compress the valley areas of a layer of cellular foam, if cellular foam under heat is thermoplastic, so that the pressure may be little more than contacting pressure in comparison to typical embossing operations where much higher pressure and heat are required. For example, the usual steel-engraved embossing roll may be employed or a design placed on the surface of a hard rubber roll.

Our technique will be described in particular as an improvement of the processes and products described in U.S. Pat. No. 3,709,752 wherein a suede-like plastic material is made with a cellular surface composed of an undulating, irregular surface composed of tensile-ruptured cells with short plastic fibrils on the surface hereof, but which provides for a surface having a suede-like appearance of or approaching that of natural suede leather.

DESCRIPTION OF THE EMBODIMENTS

Figure 2:
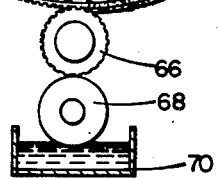
FIG. 2 is an enlarged cross-sectional and illustrative view of a prior art sheet material used in the method of FIG. 1.
Figure 2:
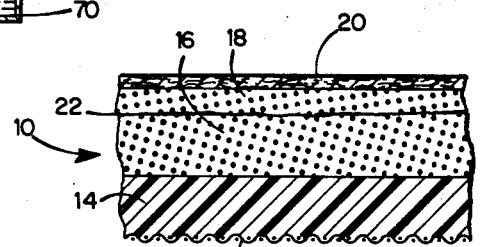

FIG. 2 shows a prior art cellular laminate, such as the type employed in the process described in U.S. Pat. No. 3,709,752, to produce a suede-like plastic material, with suede surface composed essentially of tensile-ruptured cells, which material 10 comprises a woven fabric supporting sheet 12, a solid plasticized vinyl-chloride resin layer 14, a cellular vinyl-chloride resin layer 16 and a thinner cellular vinyl-chloride resin layer 18 and a paper sheet 20 bonded to resin layer 18.

Figure 1:
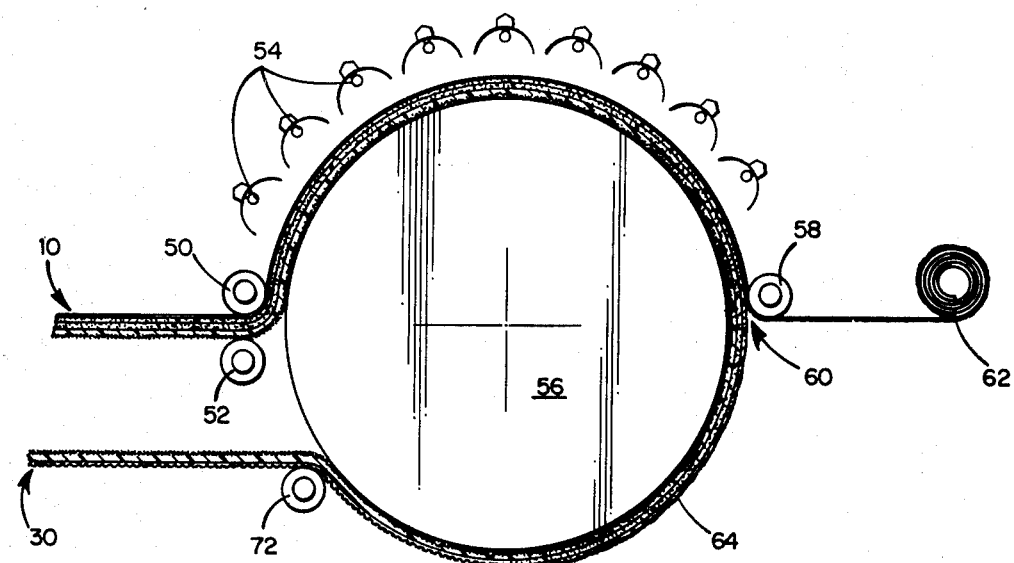
FIG. 1 is a schematic representation of a method for preparing our suede-like plastic material.

In FIG. 1, the laminate sheet material 10 is introduced by a pair of opposing rollers 50 and 52 into contact with the surface of a large steam-heated roller 56 heated, for example, to a temperature of 250° to 350° F. The woven fabric 12 side is placed against the surface of and is passed around drum 56. Infrared heaters 54 direct infrared heat to the external surface of paper sheet 20. The paper sheet 20 and a portion of the resin layer 18 adhering thereto is stripped or delaminated from the remaining portion of the laminating material 10 in the stripping or delaminating area 60. The paper sheet 20 with layer 18 containing a tensile-ruptured cell surface thereon moves by roller 58 to form roll 62. If desired, the paper substrate can be replaced by a fibrous substrate as woven sheet 12, and then embossed in the manner set forth hereafter to provide an embossed paper or fabric-supported product as described.

The stripping and delaminating operation provides a plane of tensile discontinuity in the resin layers 16 and 18, and also provides a tensile-ruptured suede surface on layer 16 which gives it a suede-like appearance, as well as a suede-like surface on layer 18 on sheet 20.

The woven fabric 12, solid layer 14 and the cellular layer 16 with the tensile-ruptured surface is then embossed on embossing roller 66 which lightly contacts the hot suede-like surface of the cellular layer 16 to impart a design effect thereon and to create raised peak areas and lower valley areas in the suede-like cellular layer. A printing roller 68 and printing ink 70 are employed in order to place within the embossed valley areas a layer of printing ink to enhance the embossed appearance of the finished article. The suede-like article so embossed is then removed through roller 72 and is shown as a finished embossed material 30. At the time of embossing, the surface of the fabric is typically at about 275° to 300° F, with the external paper surface at a lower temperature of about 250° to 270° F. The cellular layer 16 is adapted to be compressed easily by the design on the embossing roller 66, but little, if any, pressure is required in the embossing step. In the embossing step as illustrated, the embossing roller creates the valley areas, but does not apply any pressure to the raised peak areas, leaving these areas with the original suede-like surface, while compressing the cellular layer in the areas beneath the valley areas to form a smooth surface of continuous vinyl resin as a skin layer.

Figure 3:
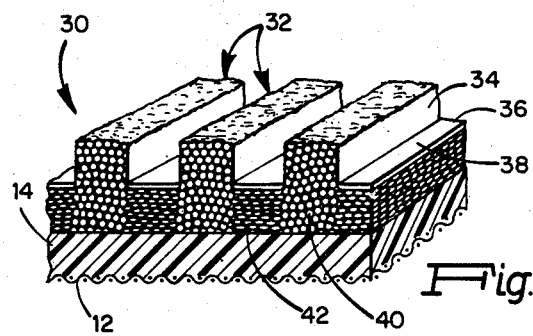
FIG. 3 is an enlarged perspective partially cross-sectional view of the suede-like plastic material prepared by the method of FIG. 1 employing the material of FIG. 2.

FIG. 3 shows an embossed suede-like material 30 prepared by our process and includes the woven fabric 12, a solid vinyl-chloride plasticized layer 14 and peak surface areas 32 having a tensile-ruptured suede-like surface appearance thereon, and valley areas 36, with the thickness between the peak and valley areas shown as 34. In the valley areas, there is a printing ink layer 38 which may be colored or clear. The cellular structure and cell density directly beneath the peak areas 32 are in their substantially original form of relatively uniform cell structure and original cell density as in the preparation of the cellular layer prior to embossing. The cellular structure and cell density of the cells 42 directly beneath the valley areas 36 are different from the cell structure and density 40 beneath the peak areas in that such areas, although still cellular, which is important to preserve the flexible nature of our material, have cells which are partially collapsed or compressed due to the embossing step, and also contain a greater cell density than the cell density in the areas 40.

The difference in cell density and cell structure, however, does not affect the overall flexibility of the sheet material as might be the case where complete compression and destruction of the cellular areas took place, and a solid layer was formed. In this embodiment illustrated, the embossing roll has been designed to impart an embossed corduroy effect on sheet material 20. However, it is recognized that a number of designs may be imparted to the suede-like material to provide various raised peak areas of textured surface throughout the material, such as for the preparation of wall or surface coverings.

Our process has also been illustrated with the use of an embossing roller; however, embossing plates or other methods of forming the valley areas and the hot layer of the cellular plastic of the suede-like surface may be used. When using rollers as illustrated or plates, since the fabric or supported sheet side of the suede-like material is at a high temperature, the embossing roll should be maintained at a lower temperature in order to prevent sticking and pulling away of the cellular layer of plastic to the embossing roll. Where another layer of cellular plastic which has a suede-like surface is employed, such as a mechanically abraded surface, the stripping and delaminating steps may be omitted and the material merely passed about a drum and heated prior to the embossing step.

As illustrated, a variety of embossing designs may be imparted to the suede material. If desired, the suede material may be prepared in any manner, stored for a period of time and susequently embossed by reheating the material and passing it through embossing rollers, although it is preferred, for economic reasons, to carry out the stripping operation and subsequent embossing step in sequence. If desired, the paper sheet 62 or a similarly produced fabric sheet as described from the stripping step may be processed by embossing the suede-like surface of the paper or fabric sheet after the stripping step. Such embossing may be carried out by the use of an additional steam roller 56 and embossing rollers 66, rather than winding up the material in a roll as illustrated. Thus, from the laminate sheet 10, one or two supported embossed suede-like surfaces may be obtained.

For the purposes of illustration, the embossed material has been shown as a supported thermoplastic material with paper and fabric sheet materials. However, any sheet substrate material may be used and bonded to the single and multiple-layer foam sheet to be delaminated. In addition, the suede material may be passed under heat and contacting pressure through a series of embossing rollers to produce a variety of surface design effects with valley areas of different depth and structure.

Other modifications and techniques will be apparent to those skilled in the art from our description and illustration of the invention.

What is claimed is:

1. A method of preparing a preferentially embossed suede-like sheet material, which method comprises:
    a. providing an integral laminate sheet material, the sheet material comprising a paper sheet, a plasticized vinyl-chloride resin foam layer adjacent the paper sheet, a solid plasticized vinyl-chloride resin adjacent the foam layer and a woven fabric adjacent the other surface of the solid layer;
    b. placing the laminate sheet material into contact with the surface of a heated rotating drum and partially about the surface of the drum, with the fabric portion of the laminate against the heated surface of the drum;
    c. heating the external paper sheet material of the laminate with infrared-radiant heaters, while rotating the sheet laminate material on the surface of the rotating drum, to heat the laminate sheet material by the heat of the rotating drum and the infrared heaters to a temperature of from about 250° to 350° F;
    d. stripping the paper sheet from the sheet material with a portion of the foam layer while heating the laminate to provide a suede-like sheet material comprising the woven fabric and the solid layer, with a hot plasticized vinyl-chloride resin foam surface layer on the rotating drum, the foam surface having a suede-like surface appearance and composed of tensile-ruptured foam cells; and
    e. embossing a desired surface design onto the suede-like foam surface, while retaining the fabric of the suede-like sheet material against the surface of the rotating heated drum, by lightly contacting the hot suede-like surface of the sheet material with slightly more than contacting pressure by an embossing roll, the heated suede-like material passed between the surface of the embossing roll and the surface of the drum, the embossing roll having a temperature lower than the temperature of the hot suede surface to be embossed, certain surface areas of the embossing roll not being placed in contact with certain portions of the original suede-like surface of the sheet material during the embossing step, while the contacting portion of the embossing roll forms a smooth, continuous, nonsuede-like skin layer composed of the cellular vinyl-chloride resin in the contacting areas to provide an embossed suede-like material having peak and valley areas, the unembossed peak areas characterized by the original suede-like tensile-ruptured surface and original cellular foam density, and the embossed valley areas comprising a nonsuede-like surface skin layer thereon and a denser cellular foam thereunder than under the peak areas.

2. The method of claim 1 which includes applying a printing ink layer to skin layer in the valley areas.

3. The method of claim 1 which includes embossing a cordurory-like design into the surface of the layer of cellular thermoplastic plastic.

4. The method of claim 1 wherein the density of the cells beneath the valley areas is from 50 to 200% greater than beneath the peak areas.

* * * * *